(12) United States Patent
Yamada et al.

(10) Patent No.: US 6,416,130 B2
(45) Date of Patent: Jul. 9, 2002

(54) SEAT SLIDE APPARATUS

(75) Inventors: Yukifumi Yamada, Toyota; Naoaki Hoshihara, Aichi-ken; Kazunari Miyaki; Satoshi Kawaguchi, both of Takaoka, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/738,348

(22) Filed: Dec. 18, 2000

(30) Foreign Application Priority Data

Dec. 17, 1999 (JP) .................................. 11-359208

(51) Int. Cl.[7] .............................................. A47C 1/023
(52) U.S. Cl. ................... 297/344.11; 248/429; 248/430
(58) Field of Search ..................... 297/344.11; 248/429, 248/430

(56) References Cited

U.S. PATENT DOCUMENTS 3,007,668 A * 11/1961 Dall .......................... 248/429
4,756,503 A * 7/1988 Fujita ........................ 248/430
5,529,397 A * 6/1996 Yoshida .................. 248/430 X
5,755,421 A * 5/1998 Meier et al. ................. 248/429

FOREIGN PATENT DOCUMENTS

| DE | 2549711 | * 5/1977 | ............... 248/429 |
| FR | 2532596 | * 3/1984 | ............... 248/429 |
| GB | 910344 | * 11/1962 | ........... 297/344.11 |
| JP | 6-74465 | 10/1994 | |

* cited by examiner

*Primary Examiner*—Peter M. Cuomo
*Assistant Examiner*—Rodney B. White
(74) *Attorney, Agent, or Firm*—Burns, Doane, Swecker & Mathis, LLP

(57) ABSTRACT

A seat slide apparatus includes an upper rail smoothly slidable relative to a lower rail without using any balls. A part of the convex portion of the lower rail made of lightweight metal alloy material contacts the flange portions of the steel-made upper rail with an elastic spring force.

Figure 1:
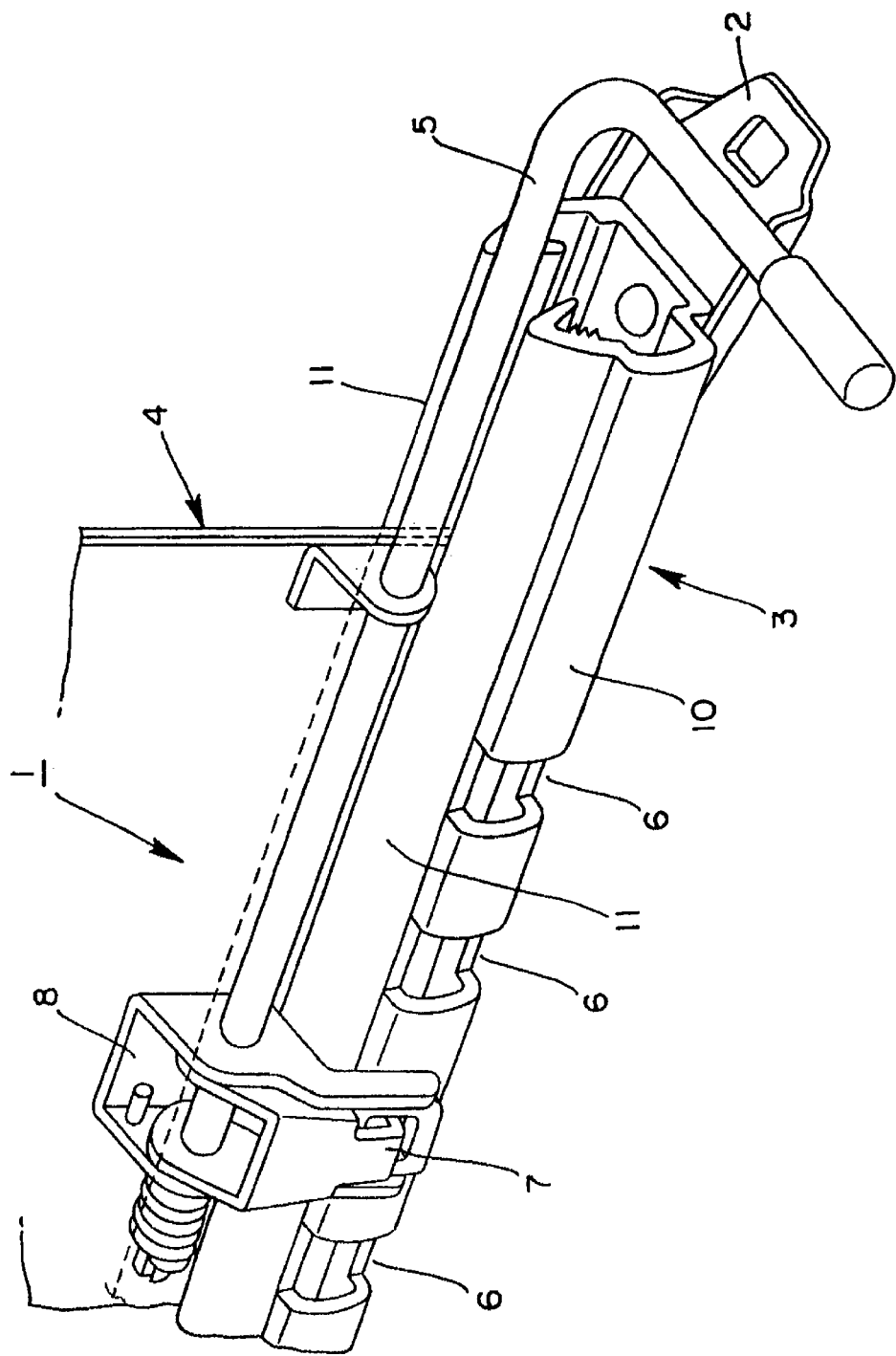

7 Claims, 2 Drawing Sheets

US 6,416,130 B2

SEAT SLIDE APPARATUS

This application is based on and claims priority under 35 U.S.C. § 119 with respect to Japanese Application No. 11-359208 filed on Dec. 17, 1999, the entire content of which is incorporated herein by reference.

FIELD OF THE INVENTION

This invention generally relates to a vehicle seat apparatus. More particularly, the present invention pertains to a seat slide apparatus for a vehicle having a combination of steel and light metal rails.

BACKGROUND OF THE INVENTION

Known vehicle seat slide apparatus are basically composed of a lower rail fixed to the vehicle floor, an upper rail which holds the seat to slidably move the seat in the vehicle longitudinal direction relative to the lower rail, and a lock mechanism for effecting engagement and disengagement of the lower and upper rails for adjusting the seat position. The seat slide apparatus should be light in weight and the sliding resistance of the upper rails relative to the lower rail should be relatively small. For this reason, the rails are made from lightweight metal alloy such as by aluminum alloy extrusion forming, and rollers or balls are positioned between the sliding surfaces of the rails to reduce frictional resistance.

However, an undesirably large number of components is required to produce these types of seat sliding apparatus because balls or rollers are required as well as a mechanism for supporting the balls or rollers. In addition, the shape of the rail must be relatively accurately dimensioned, especially at the ball or roller holding portion. However, it is difficult to maintain desired dimensions within a tolerance range using an extrusion forming method.

One proposal for addressing some of the disadvantages and drawbacks associated with the construction of known seat sliding apparatus is described in Japanese Utility Model Published Application No. Hei 6(1994)-74465. This seat slide apparatus is composed of a lower rail made of steel, an upper rail comprised of a sliding portion made of aluminum alloy and a seat support portion made of steel, and a lock mechanism engageable with a hole in the lower rail and supported on the seat support portion. The lower portion of the sliding member of this apparatus possesses an H-shaped cross-section having sufficient wall thickness. The apparatus is designed to prevent excessive play of both rails and smoothly slide the upper rail relative to the lower rail by contacting parts of both the upper portions and the outer surface of the vertical portions of the H-shaped part with the inner wall surface of the hollow portion of the lower rail.

So long as the dimensions of the two rails are kept within a small dimensional tolerance, this construction of the seat sliding apparatus reduces the number of components, such as the balls or rollers, without causing sticking during the sliding movement of the upper rail relative to the lower rail due to the contact between the different materials such as steel material and aluminum alloy material, However, this construction of the seat sliding apparatus requires high accuracy forming for the rails. Even a slight deviation from the tolerance causes an excessive play between both rails, thus increasing the sliding resistance.

In light of the foregoing, a need exists for a seat sliding apparatus that is not as susceptible to the disadvantages and drawbacks identified above.

A need exists for a seat slide apparatus which utilizes a different technological solution to produce an improved seat slide apparatus.

SUMMARY OF THE INVENTION

According to the present invention, the seat slide apparatus is designed so that a portion of the steel upper rail contacts the inner wall of the hollow portion of the lower rail by using a spring force. It is preferable to provide a surface portion having indented and projecting portions (grooves and ridges) on the inner wall of the hollow portion of the lower rail. A portion of the upper rail is elastically in contact with the surface portion having the projections.

The dimensional tolerance range of the upper rail and the lower rail can be wider by utilizing the elastic characteristics of the upper rail and without causing excessive play of the upper rail during sliding motion relative to the lower rail. In addition, the sliding resistance is kept constant and the assembly work is easier to carry out.

Thus, according to one aspect of the invention, a seat slide apparatus includes a lower rail made from light metal alloy materials having a pair of side portions upwardly extending from both ends of the base portion, with each surface of the inner wall of the side portion having a projection portion. An upper rail made from steel material has flange portions upwardly extending from both ends of a horizontal bottom portion, and each flange portion elastically contacts the projection portions.

According to another aspect of the invention, a vehicle seat slide apparatus includes a lower rail, an upper rail and a lock mechanism. The lower rail is adapted to be secured to the floor of the vehicle and includes a base portion and a pair of side portions. Each of the side portions extends upwardly from one end of the base portion and possesses an inwardly inclined portion. A plurality of projections extend from the inner wall surface of each inclined portion. The upper rail includes a horizontal bottom portion and a pair of flange portions extending upwardly from ends of the horizontal bottom portion. Each flange portion faces one of the inclined portions of the side portion of the lower rail, and each of the flange portions of the upper rail is in contact with the projections of one of the inclined portions. The lock mechanism is engageable with a portion of the lower rail and the upper rail to fix the position of the upper rail with respect to the lower rail.

According to another aspect of the invention, a seat slide apparatus for a vehicle includes a lower rail adapted to be secured to the vehicle floor, an upper rail and a lock mechanism. The lower rail includes a base portion and a pair of side portions, with each of the side portions extending upwardly from one end of the base portion. The upper rail includes a horizontal bottom portion and a pair of flange portions extending upwardly from ends of the horizontal bottom portion. Each flange portion includes a surface portion facing a surface portion of the side portion. A plurality of projections extend away from either the surface portion of each side wall or the surface portion of each flange, and the other of the surface portion of each side wall and the surface portion of each flange contacts the projections. The lock mechanism is adapted to engage a portion of the lower rail and the upper rail to fix the position of the upper rail with respect to the lower rail.

BRIEF DESCRIPTION OF THE DRAWING FIGURES

Figure 2:
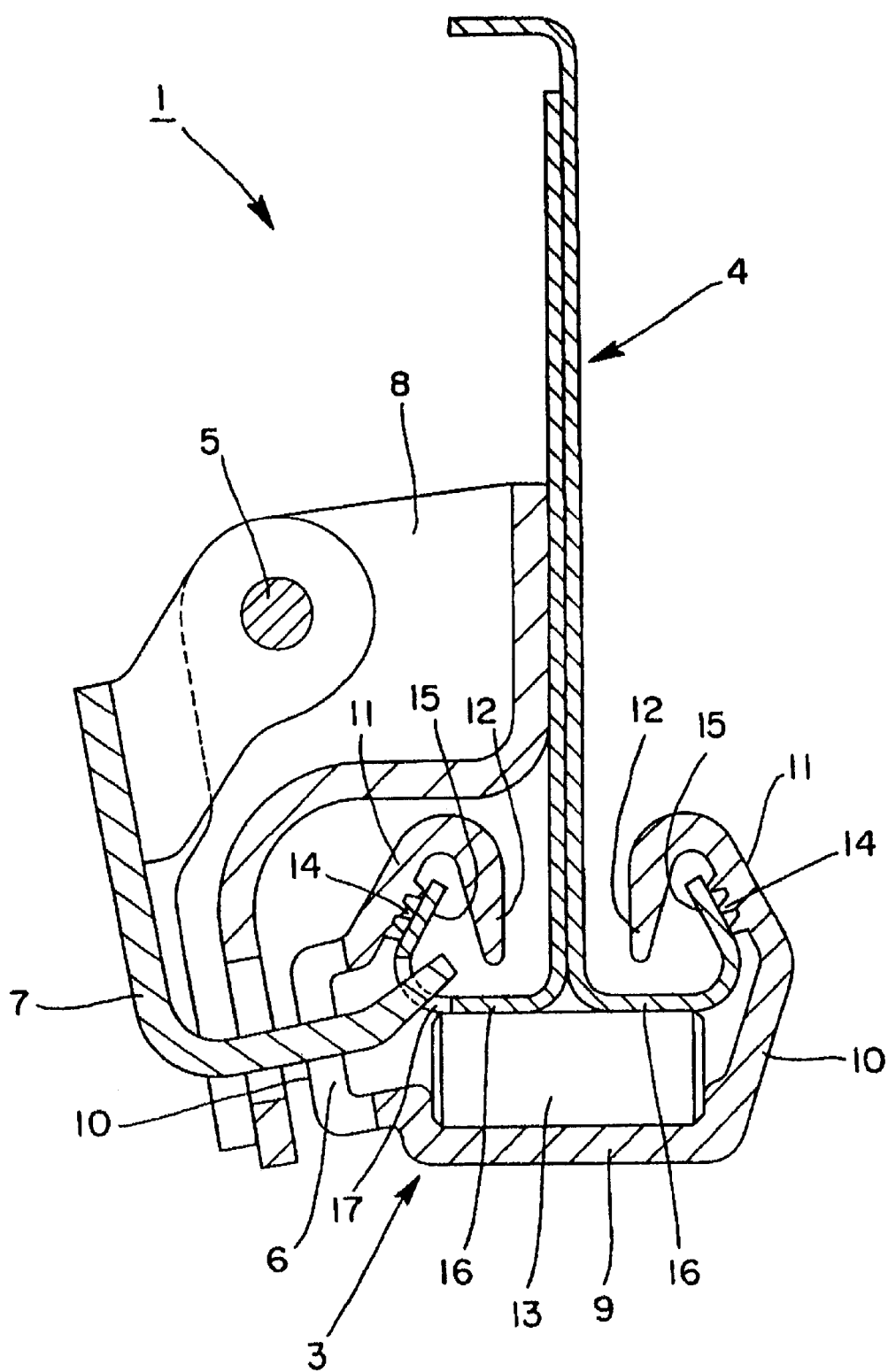

The foregoing and additional features and characteristics of the present invention will become more apparent from the following detailed description considered with reference to the accompanying drawing figures in which like reference numerals designate like elements and wherein:

FIG. 1 is a perspective view of a seat slide apparatus according to the present invention; and FIG. 2 is a cross-sectional view of the seat slide apparatus shown in FIG. 1.

DETAILED DESCRIPTION OF THE INVENTION

Referring to FIG. 1, the seat slide apparatus 1 according to the present invention includes a lower rail 3 that is adapted to be fixed to the vehicle floor through a bracket 2, an upper rail 4 slidably disposed in the longitudinal direction relative to the lower rail 3, and a lock mechanism 7 operated by a handle 5 and engageable with holes 6 provided on the lower rail 3. The lock mechanism 7 is supported by the upper rail through a bracket 8.

Referring to FIG. 2, the lower rail 3 is formed by extrusion of light metal alloy such as aluminum alloy and includes a pair of side portions 10 extending upwardly from both sides of a base portion 9, an upwardly and slightly inwardly inclined portion 11 extending from each of the side portions 10, and a tip portion 12 extending downward from the top end of each inclined portion 11. A plurality of rollers 13 are situated on the base portion 9.

The holes 6 receiving the engaging part of the lock mechanism 7 are provided on one of the side portions 10 of the lower rail 3. The inner wall surface of the inclined portion 11 of each side portion 10 is provided with a surface region or surface portion 14 having one or more convex elements or projections. Thus, the surface portion possesses surface characteristics differing from the surface characteristics of the portion of the inner wall surface of each side portion adjoining the surface portion 14. Generally speaking, the surface portion 14 possesses a plurality of spaced apart projections, with grooves being defined between adjacent projections. The projections or protuberances of the surface portion 14 can be, for example, knurled or grooved, or can be a somewhat wave-shaped configuration.

The upper rail 4 is composed of two generally L-shaped plates made from spring steel. The two generally L-shaped plates are connected to form a reverse T- shaped upper rail. The end of the horizontal bottom portion 16 of each plate extends upwardly and inwardly to form a flange portion 15 at each side of the upper rail. Both flange portions 15 are adapted to be elastically deformed inwardly or outwardly relative to the horizontal bottom portion 16. In addition, the horizontal bottom portions 16 of the upper rail 4 are in contact with the rollers 13.

A through hole 17 is provided in one of the flange portions 15 of the upper rail 4. The tip end of the lock mechanism 7 forming an engaging part of the lock mechanism 7 extends into and is engageable with the hole 17 in the flange portion 15 and one of the holes 6 in the side portion 10 of the lower rail 3 to lock the upper and lower rails 4, 3 relative to one another.

The elastic flange portions 15 of the upper rail 4 face towards and are always in contact with the respective surface portions 14 of the lower rail 3. It is to be understood that the surface portions 14 are not limited to the shape and configuration shown in FIG. 1. The surface portions 14 can be in a variety of other configurations, including a surface having arc-shaped regions or reverse V-shaped regions. The surface portions 14 forming projection portions preferably contact the respective flange portions 15 along several spaced apart line contacts or several spaced apart point contacts.

When the lock mechanism 7 is disengaged from the holes 6 of the lower rail 3 by operating the handle 5, the upper rail 4 is free to move relative to the lower rail 3 and the driver can thus adjust the seat to any preferable position. Rattling is prevented during sliding movement of the seat or under vehicle vibration conditions because the flange portions 15 of the upper rail 4 elastically contact the respective surface portion 14 of the lower rail 3 that is provided with the projections. In addition, the sliding movement between the steel and light weight metal alloy material avoids sticking between the two parts and also reduces the sliding resistance. Moreover, abrasion powder generated by the frictional contact of the light weight metal alloy material is able to enter the bottom of the surface of the indented regions or grooves of the surface portion 14, thus avoiding interference with the siding surface. It is thus possible to achieve a relatively constant sliding resistance. It is also to be understood that the convex portion(s) or projections forming the surface portion 14 can also be made separately from the lower rail 3 and then subsequently fixed to the side portions 10 of the lower rail 3.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat slide apparatus comprising:
    a lower rail made from lightweight metal alloy material, the lower rail including a base portion, a pair of side portions each extending upwardly from one end of the base portion, and an inwardly inclined portion extending inwardly in a widthwise direction from each side portion, at least a portion of an inner wall surface of each inwardly inclined portion having a plurality of projection portions that are spaced apart from one another in the widthwise direction of the inwardly inclined portion; and
    an upper rail made from steel material, the upper rail including a horizontal bottom portion and a pair of flange portions extending upwardly from both ends of the bottom portion, each flange portion of the upper rail being inclined inwardly and being positioned inside one of the inwardly inclined portions of the lower rail, each of the flange portions of the upper rail being always in contact upwardly and outwardly with the projection portions of one of the inwardly inclined portions of the lower rail.

2. The seat slide apparatus according to claim 1, wherein the upper rail is composed of two parts each having horizontal flat portions which together form the horizontal bottom portion, the two parts of the upper rail being attached together.

3. A seat slide apparatus comprising:
    a lower rail adapted to be secured to a floor of the vehicle, the lower rail including a base portion, a pair of side portions each extending upwardly from one end of the base portion, a pair of inwardly inclined portions each extending inwardly in a widthwise direction from one of the side portions, and a plurality of projections extending from an inner wall surface of each of the inwardly inclined portions, the plurality of projections on each inwardly inclined portion being spaced apart from one another in a widthwise direction of the inwardly inclined portion;

an upper rail that includes a horizontal bottom portion and a pair of flange portions extending upwardly from ends of the horizontal bottom portion, each flange portion of the upper rail being inclined inwardly and being positioned inside one of the inwardly inclined portions of the lower rail, each inwardly inclined flange portion of the upper rail facing one of the inwardly inclined portions of the lower rail, and each of the inwardly inclined flange portions of the upper rail being always in contact upwardly and outwardly with the projections of one of the inwardly inclined portions of the lower rail; and a lock mechanism engageable with a portion of the lower rail and the upper rail to fix a position of the upper rail with respect to the lower rail.

4. The seat slide apparatus according to claim 3, wherein the upper rail is composed of two parts each having horizontal flat portions which together form the horizontal bottom portion, the two parts of the upper rail being attached together.

5. A seat slide apparatus comprising:

a lower rail adapted to be secured to a floor of the vehicle, the lower rail including a base portion, a pair of side portions each extending upwardly from one end of the base portion and a pair of inwardly inclined portions each extending inwardly in a widthwise direction from one of the side portions;

an upper rail that includes a horizontal bottom portion and a pair of flange portions extending upwardly from ends of the horizontal bottom portion, each flange portion of the upper rail being inclined inwardly in a widthwise direction, each inwardly inclined flange portion of the upper rail including a surface portion facing a surface portion of one of the inwardly inclined portions of the lower rail, a plurality of projections extending away from either the surface portion of each inwardly inclined portion of the lower rail or the surface portion of each inwardly inclined flange portion of the upper rail, with the other of the surface portion of each inwardly inclined portion of the lower rail and the surface portion of each inwardly inclined flange portion of the upper rail contacting the projections, the plurality of projections on each of the inwardly inclined portions of the lower rail or each of the inwardly inclined flange portions of the upper rail being spaced apart from one another in the widthwise direction; and a lock mechanism engageable with a portion of the lower rail and the upper rail to fix a position of the upper rail with respect to the lower rail.

6. The seat slide apparatus according to claim 5, wherein the upper rail is composed of two parts each having horizontal flat portions which together form the horizontal bottom portion, the two parts of the upper rail being attached together.

7. The seat slide apparatus according to claim 5, including a roller element positioned between the base portion and the horizontal bottom portion.

* * * * *